United States Patent [19]

Steinback

[11] 3,848,310

[45] Nov. 19, 1974

[54] METHOD OF FORMING A TAPE REEL HUB BY EXTRUSION

[75] Inventor: Clarence I. Steinback, Edina, Minn.

[73] Assignee: Acrometal Products, Inc., Minneapolis, Minn.

[22] Filed: Sept. 22, 1972

[21] Appl. No.: 291,331

[52] U.S. Cl. ................ 29/159.3, 29/159 R, 29/417, 29/558, 29/DIG. 47, 242/71.8, 242/68.5

[51] Int. Cl. ................ B21k 1/40

[58] Field of Search ....... 29/159 R, 159.3, 417, 557, 29/558, DIG. 47; 242/77, 71.8, 68.5

[56] References Cited

UNITED STATES PATENTS

| | | | |
|---|---|---|---|
| 1,625,585 | 4/1927 | Archer | 242/68.5 |
| 1,688,421 | 10/1928 | Holmes | 29/159.3 |
| 2,309,666 | 2/1943 | Parker | 29/157 |
| 3,334,402 | 8/1967 | Cura | 29/159 |
| 3,447,674 | 6/1969 | Fraser | 242/68.5 X |
| 3,626,580 | 12/1971 | Shakespear | 29/558 X |
| 3,668,757 | 6/1972 | Rieder | 29/DIG. 47 |

*Primary Examiner*—C. W. Lanham
*Assistant Examiner*—Victor A. DiPalma
*Attorney, Agent, or Firm*—Merchant, Gould, Smith & Edell

[57] ABSTRACT

A method of forming a tape reel hub is disclosed consisting of heating a billet of aluminum, extruding the billet through an extrusion die having portions for forming a longitudinally extending tubular shaped object with metal saving cavities therein, severing the extruded tubular object to define a tape reel hub having a desired width, finishing the tape engaging face of the tape reel hub, and then the anodizing of the tape hub.

9 Claims, 8 Drawing Figures

METHOD OF FORMING A TAPE REEL HUB BY EXTRUSION

BACKGROUND OF THE INVENTION

1. Field of the Invention

The present invention relates generally to tape reel hubs for forming the interior tape supporting structure of a magnetic tape holding reel and more particularly concerns a tape reel hub constructed by an extrusion process.

2. Description of the Prior Art

Within the prior art tape reel hubs for forming the load bearing structure on magnetic tape reels have previously been constructed by the process of die casting. By the use of a die casting method the tape hub can be constructed having a high strength quality and possessing metal saving cavities therein. The metal saving cavities are an important feature of the tape hub as if material can be eliminated the cost of the hub is significantly decreased and additionally the inertia developed at the high rotational speeds of the tape reel can be decreased.

The die casting method was previously found to be superior to such methods as constructing hubs from aluminum bar stock, from extruded aluminum tubing, or from permanent molded aluminum hubs. These methods were far more costly, resulted in the waste of too much material, and, other than the permanent molded aluminum hubs, could not provide for metal saving cavities.

The tape hub formed by the die casting method additionally has drawbacks. Because of the nature of this process the finished product is highly porous. With a porous hub obvious surface imperfections (indentations) exist even after machining of the tape hub. These surface imperfections highly affect the quality of the tape wound on the tape engaging surface for many layers and are consequently highly undesirable. Also any cavities and imperfections in the winding surface of the tape hub will tend to trap chemicals, which are used in an anodizing process, which chemicals crystallize and cause the hub material to actually protrude above the machined surface. Additionally, the anodizing process referred to, which is used to create a more aesthetically appealing tape reel hub, produces a dull gray unattractive appearance in the tape hub formed by the die casting method. Further, a different die must be used for providing each reel hub of a different thickness.

OBJECTS AND SUMMARY OF THE INVENTION

In accordance with the invention, it is an object to provide a method of forming a tape reel hub having a lack of surface imperfections on the tape engaging face of the hub.

It is a further object to provide a tape reel hub having an aesthetically appealing jet-black color.

Additionally, it is an object of the present invention to provide a method of forming a tape reel hub whereby the width of the tape hub can be easily varied by severing portions of a longitudinally extending tubular hub to form the desired width.

In accordance with the present invention a new method of forming a tape reel hub consists of the steps of heating a billet of metal to a temperature below the melting temperature of the metal, extruding the billet through an extrusion die having portions for forming a longitudinally extending tubular shaped hub defining cavities therein, severing portions of the extruded tube to define tape reel hubs having a desired width, machining the tape engaging surface of the tape reel hub, and anodizing the tape reel hub.

DETAILED DESCRIPTION OF THE DRAWINGS

Figure 1:
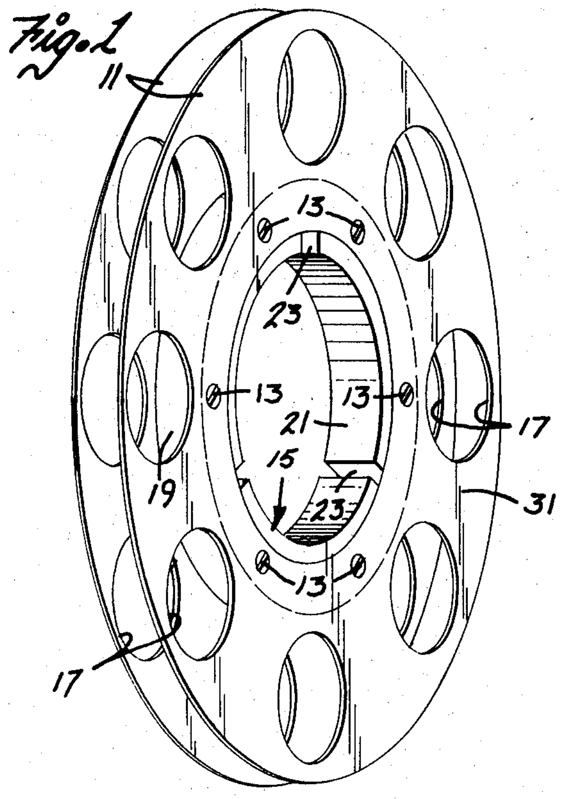
FIG. 1 is a view in perspective of a tape reel embodying the tape reel hub of the present invention.

Referring first to FIG. 1, there is shown a magnetic tape reel utilizing the tape reel hub of the present invention. The tape reel includes a pair of annular shaped spaced apart metal tape constraining plates 11 which are attached by screws 13 into threaded holes 14 in the tape reel hub 15 of the present invention. The spaced apart plates 11 have large holes 17 therein near the outside periphery of the reel and small size holes (not shown) near the inside periphery for the insertion of the screws 13 therethrough. The plates 11 may be constructed of aluminum or other lightweight material.

Figure 2:
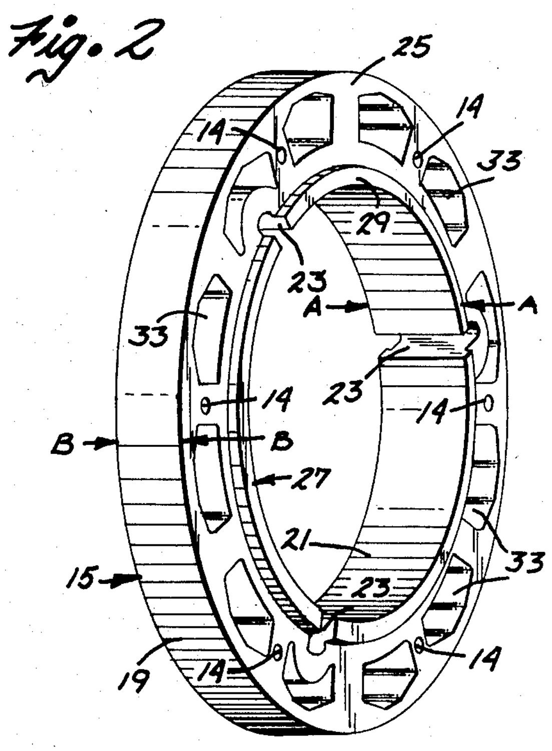
FIG. 2 is a view in perspective of the tape reel hub according to the present invention.

Referring now additionally to FIG. 2, there is shown the tape reel hub 15 of the present invention. The tape reel hub 15 has a circular outside tape engaging surface 19 and a circular inside surface 21. Surface 21 fits around an arbor or spindle of a computer. The inside surface 21 has inwardly directed slots 23 extending along the width A—A of the hub 15. The slots 23 functionally cooperate with protrusions on the arbor or spindle of the computer. The width A—A of the tape reel hub at the inside surface 21 of the tape reel hub is greater than the width B—B of the tape reel hub 15 at the outside tape engaging surface 19 of the hub 15. This difference in width is provided by machining each spaced apart surfaces 25 of the hub 15 inwardly from the outside tape engaging surface 19 to just prior to the inside surface 21 to form the lip 27. The distance from the top surface 29 of the lip 27 to the surface 25 of the hub 15 corresponds to the thickness of the plate 11 so that when the plates 11 are attached to the hub 15 by the screws 13 the completed tape reel has a pair of flat spaced apart surfaces 31.

Metal saving cavities 33 are located within the tape reel hub 15 extending between each surface 25 across the width B—B. These metal saving cavities decrease the cost of the tape reel hub as less material is used and they additionally decrease the inertia of the tape reel hub as less material is rotated at the rapid speeds encountered by tape reels. The shape of the metal saving cavities 33 may be varied in order to form the optimal configuration in view of the desire to eliminate material for cost and inertia and in view of the opposing need for material in order to lend strength to the hub.

Figures 3, 4:
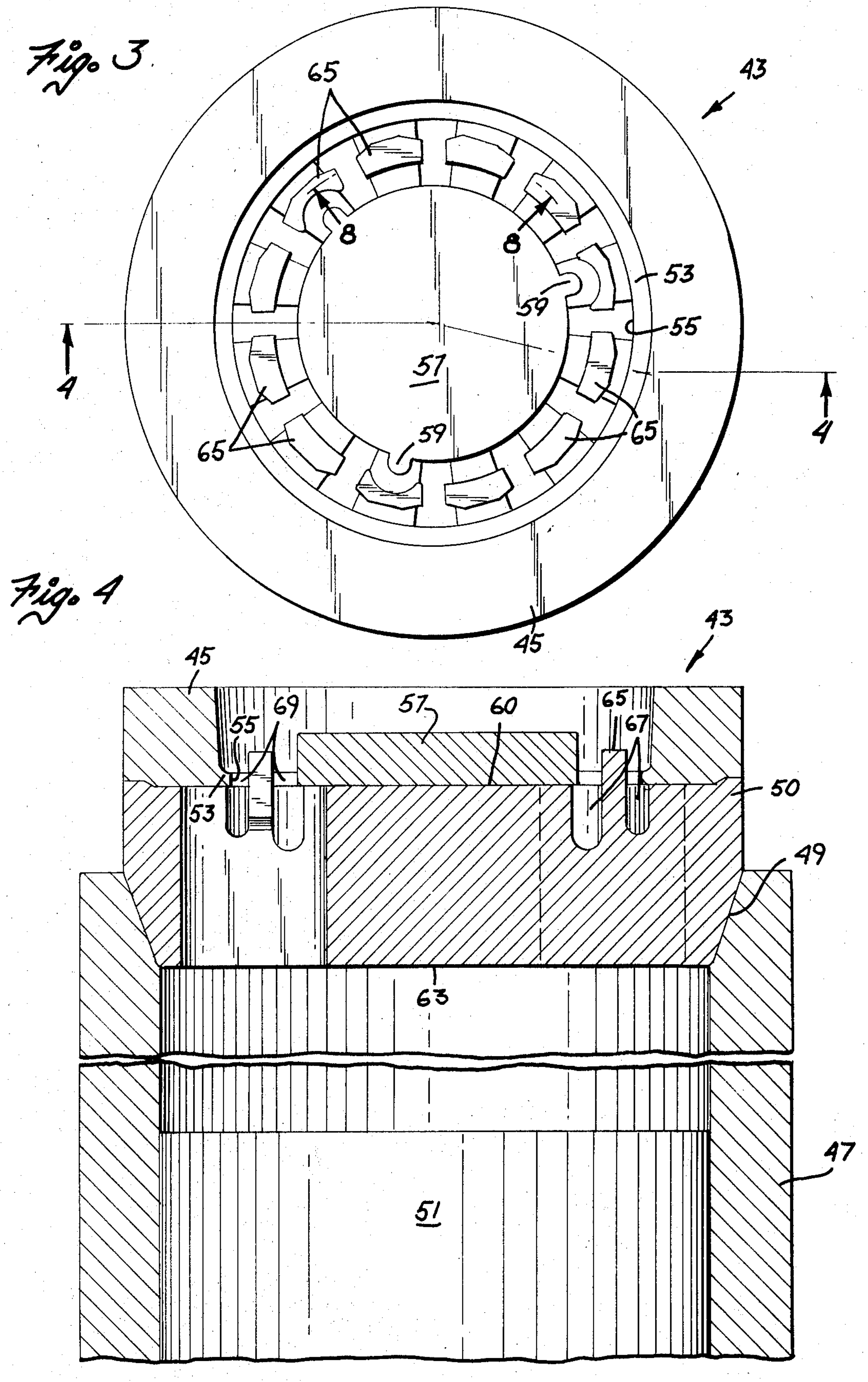
FIG. 3 is a view in end elevation of the extrusion dies utilized to form the tape reel hub.
FIG. 4 is a view along line 4—4 of FIG. 3.

In reference to FIGS. 3 and 4 of the drawings, which have been selected for purposes of illustrating a porthole type extrusion die assembly for forming the tape reel hub of the present invention, it will be noted that the general type of die structure best adapted to a realization of the present invention incorporates a male die member identified in its entirety by the reference numeral 43, and a female or exterior contour-controlling die member 45. As is typical in this form of extrusion die assembly, the male die 43 and its complimentary female die 45 are normally assembled in abutting coaxial relationship within a suitable tool holder or annulus (not shown), and the pair of die elements so assembled are adapted to be aligned with a billet chamber 47. Chamber 47 is typically sized at a diameter of approximately seven inches. The alignment of the assembled dies is normally obtained through the medium of a suitable chamfered seal 49 between the male die and the billet chamber, the latter being equipped with a reciprocatory ram 51 for the purpose of exerting the necessary pressure for extruding a billet (not shown) through the extrusion die assembly. A second suitable chamfered seal 50 aligns the male die 43 with the female die 45.

Figures 5, 6, 8:
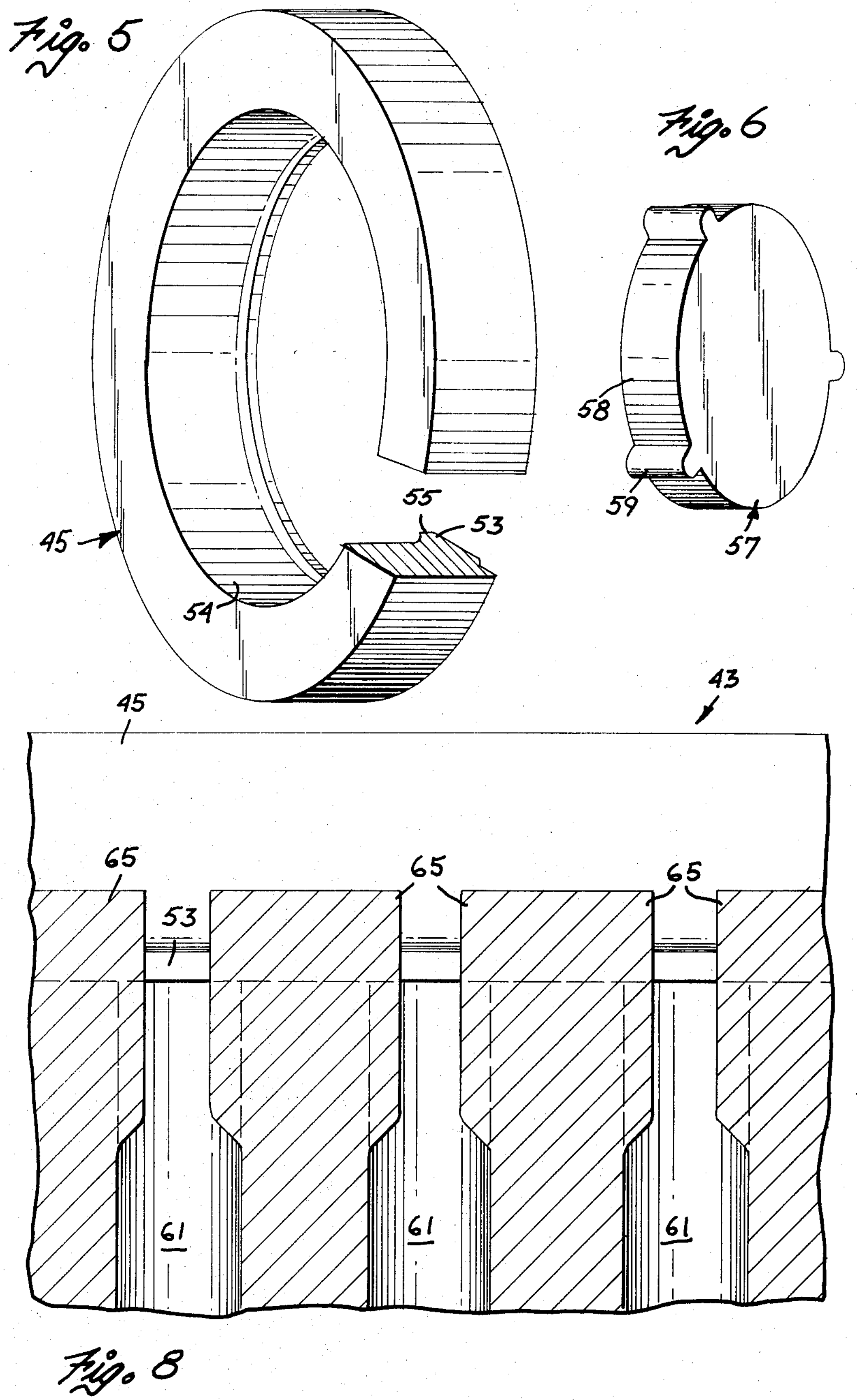
FIG. 5 is a view in perspective of the outside back portion of the die of the present invention.
FIG. 6 is a view in perspective of the inside back portion of the die of the present invention.
FIG. 8 is a view along line 8—8 of FIG. 3.

Referring now additionally to FIG. 5, the female or exterior contour-controlling die or mandrel 45 is shown in detail. The die is formed in an annular shape having an inwardly directed protrusion 53 located on the inner periphery 54 of the die 45 for a surface 55 of protrusion 53 to define the outside annular shape of the tape reel hub to be formed.

Referring now additionally to FIG. 6 there is shown a mandrel 57 which is located on the face 60 of the male die 43 for forming the shape of the inside annular periphery of the tape reel hub. It will be noted that the mandrel 57 contains protrusions 59 which are shaped so as to form the slots 23 of the tape reel hub 15, in the same manner as the protrusion 53 forms the outside tape engaging surface 19 of the tape reel hub 15.

Figure 7:
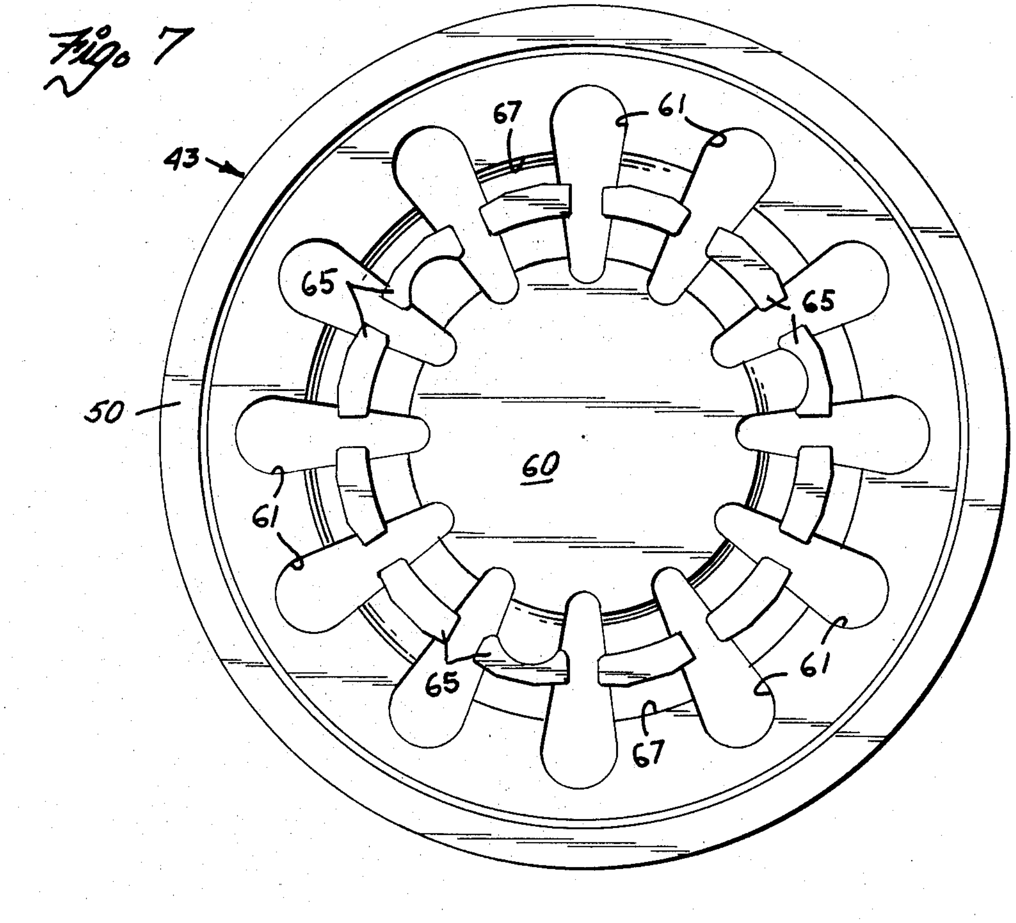
FIG. 7 is a view in end elevation of the extrusion die with the back portions removed.

The male die 43 contains a plurality of portholes 61 extending from the back surface 63 of the male die 43 to the front surface 60 thereof. Referring now to FIG. 7 (shown with mandrels 57 and 45 removed), and FIG. 8, it can be seen that the male die 47 contains a plurality of upwardly directed protrusions 65 which extend upwardly within mixing cavities 67 of the male die 43. These protrusions 65 form the metal saving cavities 33 within the reel hub 15.

In operation, a preheated billet of metal is located within chamber 47 for usage in the extrusion operation. In extruding a tape reel hub any of a variety of metals may be used. However, 6061T6 aluminum or 6063T6 aluminum has been found to have more than adequate extrusion properties and additionally they are sufficiently strong and also lend themselves well to an anodizing process and are capable of being dyed to form an aesthetically appealing jet-black color. These materials are heated to approximately 900° F. The preheated billet of aluminum of approximately 30 to 50 pounds may be brought by means of conveyor into chamber 47 and while therein it is pushed through the extrusion die by means of ram 51.

Under the influence of pressure by the extrusion ram 51, the aluminum metal divides itself into a plurality of streams of metal flowing within the portholes 61. The streams of metal flowing within portholes 61 flow through the male die 43 and around the mandrel protrusions 65 where the stream coalesce in the mixing or welding cavities 67 adjacent the entrance to the female die 45 and the mandrel 57. Continued extrusion pressure causes the metal to be forced out of the mixing or welding cavity 67 and to be extruded through the orifice 69 which is defined by the inside surface 54 of the projection 53 on female die 45 and the outside surface 58 of the mandrel 57. As the aluminum billet exits from the extrusion die it is in an elongated tubular form of approximately 9 to 15 feet in length having a cross sectional configuration of the tape reel hub 15 shown in FIG. 2 without, of course, the lip 27 and screw holes 14.

After the extruded tubular shaped hub has been formed, the tubular hub, if it is desirable, may be heat treated by well known techniques. Following the heat treatment the hub may be cooled utilizing well known techniques.

The next step in the formation of a finished hub 15 is to cut the formed tubular hub into sections of a desired width. The cut will be made perpendicularly with respect to the longitudinal extending axis of the tubular hub and can be made by means of a fast band saw or a radial saw. In order to form the hub shown in FIG. 2, the cut will be of a thickness slightly greater than thickness A—A. Widths will typically be from one-half inch to two inches.

After each individual hub 15 has been cut off at the desired width all of the surfaces of hub 15, surfaces 19, 21, and 25, are finished. The hub 15 may be mounted on a special chucking lathe and machined by tool. During this finishing process the lip 27 may be formed by cutting radially inwardly from surface 19 to a location just prior to surface 21 so as to form lip 27. The screw holes 14 are then formed. After this machining operation the tape reel hub 15 is then suitable for attachment of the plates 11 thereon to form a finished tape reel. It should be noted that it is not necessary to provide the lip 27 but that with its use a tape reel with flat surfaces 31 is provided.

Within the industry utilizing tape reels, particularly the computer industry, it has been found that the reels are on constant display and that they should therefore be aesthetically appealing. Accordingly, the tape reel hub 15 may be anodized and dyed prior to being assembled to form the finished tape reel. In the anodizing process, the tape hub 15 is first cleaned by, for instance, placing the hub in a rack and dipping the rack in a caustic etch. The etch may consist of a mild acid. The etch material strips the hub of all natural oxides on the surface of the tape reel hub. In addition to eating away the surface of the aluminum hub the etch makes the hub more smooth. The hub 15 is then placed in an anodizing tank containing an acid such as hydrochloric acid or sulfuric acid. While in the anodizing tank an electrical current is passed through the hub 15 which results in the formation of an aluminum oxide on the surface thereof. This hardens the surface to approximately 0.0002 inches and the aluminum oxide gives the hub 15 an even shade of silver-gray.

After the anodizing process, the hub 15 is dipped in a tank of black dye. The dye used may be any known dye which will color oxide. Within the black dye tank the black dye soaks into the aluminum oxide coating on the hub 15 giving the hub 15 a pleasant shining jet-black appearance. It has been found that this jet-black appearance is highly pleasing to the eye and consequently is desirable in particularly the computer industry. The hub 15 formed by my process creates a shinier apparence than known prior art hubs because the hub formed by my process is more dense. In order to more readily retain the black dye within the aluminum oxide layer a seal may be applied. By merely inserting the hub 15 into a tank of hot water or into steam the pores of the hub 15 can be sealed thus retaining the jet black appearance of the hub.

Thus it is apparent that there has been provided, in accordance with the invention, a method of forming a tape reel hub that fully satisfies the objects and advantages set forth above. While the invention has been described in conjunction with certain specific steps, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method of forming a tape reel hub comprising the steps of:

a. heating a billet of metal to a temperature below the melting temperature of said metal;

b. extruding said billet through an extrusion die constructed for forming a longitudinally extending tubular shaped object having a longitudinal axis;

c. severing said extruded tube perpendicularly to said longitudinal axis to define tape hubs having desired widths; and d. machining an outside surface of said tape hub to form a smooth tape engaging face.

2. The method of forming a tape reel hub of claim 1 wherein said die contains portions for forming longitudinally extending cavities within said extruded tube parallel with respect to said tube axis.

3. The method of forming a tape reel hub of claim 2 further including the step of anodizing the hub after said machining step.

4. The method of forming a tape reel hub of claim 3 wherein said billet of material extruded into a tape reel hub consists of 6063T6 aluminum.

5. The method of forming a tape reel hub of claim 3 wherein said billet of material extruded into a tape reel hub consists of 6061T6 aluminum.

6. The method of forming a tape reel hub of claim 4 further including the step of dying said tape reel hub after said anodizing step to provide a jet-black finish.

7. The method of forming a tape reel hub of claim 5 further including the step of dying said tape reel hub after said anodizing step to provide a jet-black finish.

8. The tape reel hub formed by the method of:

a. heating a billet of 6063T6 aluminum to a temperature below the melting temperature of said aluminum;

b. extruding said billet through an extrusion die constructed for forming a longitudinally extending tubular shaped object having a longitudinal axis and defining cavities therein extending longitudinally parallel with respect to said axis;

c. heat treating said tubular shaped object;

d. severing said extruded tube perpendicularly with respect to said axis to define tape reel hubs having desired widths;

e. machining an outside surface of said tape reel hub to form a tape engaging face;

f. cleaning said hubs of natural oxides;

g. anodizing said hubs; and h. dying said hubs to provide a jet-black finish.

9. The tape reel hub formed by the method of:

a. heating a billet of 6061T6 aluminum to a temperature below the melting temperature of said aluminum;

b. extruding said billet through an extrusion die constructed for forming a longitudinally extending tubular shaped object having a longitudinal axis and defining cavities therein extending longitudinally parallel with respect to said axis;

c. heat treating said tubular shaped object;

d. severing said extruded tube perpendicularly with respect to said axis to define tape reel hubs having desired widths;

e. machining an outside surface of said tape reel hub to form a tape engaging face;

f. cleaning said hubs of natural oxides;

g. anodizing said hubs; and h. dying said hubs to provide a jet-black finish.

* * * * *